United States Patent
Baillie et al.

(10) Patent No.: US 12,441,819 B2
(45) Date of Patent: Oct. 14, 2025

(54) TITANIUM BIPHENYLPHENOL POLYMERIZATION CATALYSTS

(71) Applicant: Dow Global Technologies LLC, Midland, MI (US)

(72) Inventors: Rhett A. Baillie, Pearland, TX (US); Roger L Kuhlman, Lake Jackson, TX (US); Liam P. Spencer, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 774 days.

(21) Appl. No.: 17/771,841

(22) PCT Filed: Nov. 4, 2020

(86) PCT No.: PCT/US2020/058804
§ 371 (c)(1),
(2) Date: Apr. 26, 2022

(87) PCT Pub. No.: WO2021/091959
PCT Pub. Date: May 14, 2021

(65) Prior Publication Data
US 2022/0396647 A1 Dec. 15, 2022

Related U.S. Application Data

(60) Provisional application No. 62/930,432, filed on Nov. 4, 2019.

(51) Int. Cl.
| | |
|---|---|
| C08F 4/64 | (2006.01) |
| C07F 7/28 | (2006.01) |
| C08F 4/02 | (2006.01) |
| C08F 4/52 | (2006.01) |
| C08F 4/76 | (2006.01) |
| C08F 10/02 | (2006.01) |
| C08F 110/02 | (2006.01) |

(52) U.S. Cl.
CPC ............ *C08F 4/76* (2013.01); *C07F 7/28* (2013.01); *C08F 4/02* (2013.01); *C08F 4/64193* (2013.01); *C08F 110/02* (2013.01); *C08F 4/64* (2013.01)

(58) Field of Classification Search
CPC .............. C07F 7/28; C08F 4/64193
See application file for complete search history.

(56) References Cited

U.S. PATENT DOCUMENTS

| | | | |
|---|---|---|---|
| 6,211,311 B1 | 4/2001 | Wang et al. | |
| 6,897,276 B2 | 5/2005 | Boussie et al. | |
| 7,241,714 B2 * | 7/2007 | Boussie | C08F 10/00 502/103 |
| 8,450,438 B2 * | 5/2013 | Aboelella | C08F 210/16 526/170 |
| 8,609,794 B2 * | 12/2013 | Klosin | C08F 210/16 526/170 |
| 8,637,618 B2 * | 1/2014 | Diamond | C08F 10/00 526/172 |
| 9,029,487 B2 * | 5/2015 | Klosin | C08F 210/16 526/172 |
| 9,234,060 B2 | 1/2016 | Kao et al. | |
| 9,522,855 B2 * | 12/2016 | Klosin | C08F 10/00 |
| 9,527,940 B2 * | 12/2016 | Demirors | C08F 210/16 |
| 9,527,941 B2 * | 12/2016 | Demirors | C08F 210/16 |
| 9,534,070 B2 * | 1/2017 | Spencer | C07F 7/00 |
| 9,751,998 B2 * | 9/2017 | Klosin | C07F 5/00 |
| 10,144,791 B2 * | 12/2018 | Klosin | C08F 210/16 |
| 10,526,431 B2 * | 1/2020 | Fontaine | C08F 210/16 |
| 10,647,797 B2 * | 5/2020 | Fontaine | C08F 210/16 |
| 10,870,713 B2 * | 12/2020 | Figueroa | C08F 4/64193 |
| 11,193,008 B2 | 12/2021 | Lue et al. | |
| 11,242,415 B2 * | 2/2022 | Krasovskiy | C08F 10/02 |
| 12,338,301 B2 * | 6/2025 | Young | C08F 4/02 |
| 2011/0282018 A1 * | 11/2011 | Klosin | C08F 210/16 526/170 |
| 2013/0144018 A1 | 6/2013 | Klosin et al. | |
| 2015/0291713 A1 | 10/2015 | Klosin et al. | |
| 2016/0108156 A1 | 4/2016 | Klosin et al. | |
| 2018/0265604 A1 | 9/2018 | Figueroa et al. | |
| 2018/0282452 A1 | 10/2018 | Fontaine et al. | |
| 2022/0403061 A1 * | 12/2022 | Padilla-Acevedo | C08F 4/65916 |
| 2023/0098987 A1 * | 3/2023 | Padilla-Acevedo | C08F 110/02 526/170 |

FOREIGN PATENT DOCUMENTS

| | | |
|---|---|---|
| JP | 2015193612 A | 11/2015 |
| WO | 2011/146044 A1 | 11/2011 |
| WO | WO-2019123028 A1 * 6/2019 | ............ C08F 210/16 |

OTHER PUBLICATIONS

WO-2019123028-A1 (Jun. 27, 2019); machine translation. (Year: 2019).*
International Search Report & Written Opinion for related PCT Application PCT/US2020/058804, mailed Feb. 4, 2021 (12 pgs).
International Preliminary Report on Patentability for related PCT Application PCT/US2020/058804, mailed May 19, 2022 (8 pgs).

* cited by examiner

*Primary Examiner* — Rip A Lee

(57) ABSTRACT

Embodiments of the present disclosure directed towards titanium biphenylphenol polymerization precatalysts of Formula (I).

14 Claims, No Drawings

TITANIUM BIPHENYLPHENOL POLYMERIZATION CATALYSTS

This application is a National Stage Application under 35 U.S.C. § 371 of International Application Number PCT/US2020/058804, filed Nov. 4, 2020 and published as WO 2021/091959 on May 14, 2021, which claims the benefit to U.S. Provisional Application 62/930,432, filed Nov. 4, 2019, the entire contents of which are incorporated herein by reference in its entirety

FIELD OF DISCLOSURE

Embodiments of the present disclosure are directed towards titanium biphenylphenol polymerization catalysts, more specifically, titanium biphenylphenol polymerization catalysts of Formula I.

BACKGROUND

Polymers may be utilized for a number of products including as films, fibers, nonwoven and/or woven fabrics, extruded articles, and/or molded articles, among others. Polymers can be made by reacting one or more types of monomer in a polymerization reaction in the presence of a polymerization catalyst.

SUMMARY

The present disclosure provides various embodiments, including: a titanium biphenylphenol polymerization precatalysts of Formula I:

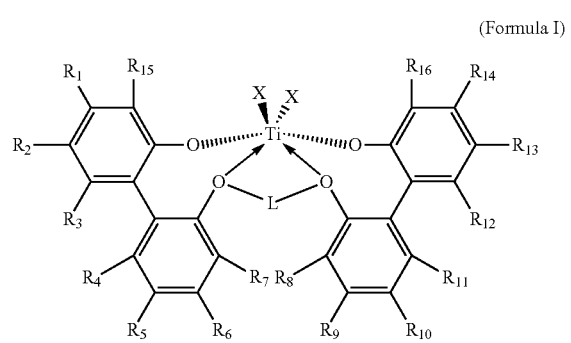

(Formula I)

wherein each of $R^7$ and $R^8$ is independently a $C_1$ to $C_{20}$ alkyl, aryl, aralkyl or a hydrogen; wherein each of $R^5$ and $R^{10}$ is independently a $C_1$ to $C_{20}$ alkyl, aryl, aralkyl, halide, or a hydrogen; wherein each $R^2$ and $R^{13}$ is independently a $C_1$ to $C_{20}$ alkyl, aryl, aralkyl or a hydrogen; wherein each of $R^{15}$ and $R^{16}$ is a 2,7-disubstituted carbazol-9-yl or a 3,6-disubstituted-carbazol-9-yl; wherein L is a $C_2$-$C_4$ alkylene that forms a 2-carbon bridge, 3-carbon bridge, or a 4-carbon bridge respectively, between the two oxygen atoms to which L is covalently bonded; wherein each of $R^1$, $R^3$, $R^4$, $R^6$, $R^9$, $R^{11}$, $R^{12}$, and $R^{14}$ is independently a halide or a hydrogen; and wherein each X is independently a hydrocarbyl, halide, pseudohalide, hydroxy group, alkoxy group, phenoxy group, aryloxy group, or a hydrogen and at least one X is not a hydrocarbyl. As used herein, a precatalyst is a catalyst compound prior to exposure to an activator.

A method of making a titanium biphenylphenol polymerization catalyst, the method comprising contacting, under activating conditions, a titanium biphenylphenol polymerization precatalyst of Formula I with an activator so as to activate the titanium biphenylphenol polymerization precatalyst of Formula I, thereby making the titanium biphenylphenol polymerization catalyst;

A titanium biphenylphenol polymerization catalyst; and

A method of making a polyethylene, the method comprising polymerizing an olefin monomer in a single gas-phase polymerization reactor in presence of the titanium biphenylphenol polymerization catalyst to make a polyethylene composition, as described herein.

DETAILED DESCRIPTION

The titanium biphenylphenol polymerization precatalysts herein can be represented by the Formula I:

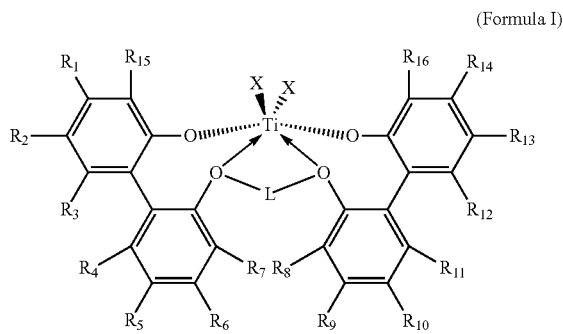

(Formula I)

wherein each of $R^7$ and $R^8$ is independently a $C_1$ to $C_{20}$ alkyl, aryl, aralkyl or a hydrogen;
wherein each of $R^5$ and $R^{10}$ is independently a $C_1$ to $C_{20}$ alkyl, aryl, aralkyl, halide, or a hydrogen;
wherein each of $R^2$ and $R^{13}$ is independently a $C_1$ to $C_{20}$ alkyl, aryl, aralkyl or a hydrogen;
wherein each of $R^{15}$ and $R^{16}$ is a 2,7-disubstituted carbazole or a 3,6-disubstituted carbazole;
wherein L is a $C_2$-$C_4$ alkylene that forms a 2-carbon bridge, 3-carbon bridge, or a 4-carbon bridge respectively, between the two oxygen atoms to which L is covalently bonded;
wherein each of $R^1$, $R^3$, $R^4$, $R^6$, $R^9$, $R^{11}$, $R^{12}$ and $R^{14}$ is independently a halide or a hydrogen; and
wherein each X is independently a hydrocarbyl, halide, pseudohalide, hydroxy group, alkoxy group, phenoxy group, aryloxy group, or a hydrogen and at least one X is not a hydrocarbyl.

Surprisingly, polymerization catalysts made using the titanium biphenylphenol polymerization precatalysts of the disclosure can produce lower molecular weight polymers as compared to polymers made with other (non-inventive) polymerization catalysts at similar polymerization conditions, as detailed herein. Lower molecular weight polymers are desirable in some applications.

In addition, surprisingly, the titanium biphenylphenol polymerization catalysts of the disclosure can have a lower catalyst productivity than other polymerization catalysts at similar polymerization conditions, as detailed herein. A lower catalyst productivity is desirable in some processes.

Additionally, surprisingly, the titanium biphenylphenol polymerization catalysts of the disclosure can produce polymers which incorporate less comonomer as compared to polymers made with other polymerization catalysts at similar polymerization conditions, as detailed herein. Incorporating less comonomer is desirable in some applications.

Further, surprisingly, the titanium biphenylphenol polymerization catalysts of the disclosure can provide improved reactor operability, as detailed herein.

As mentioned, each of $R^7$ and $R^8$, as shown in Formula I, can independently be a $C_1$ to $C_{20}$ alkyl, aryl, aralkyl or a hydrogen. One or more embodiments provide that each of $R^7$ and $R^8$ is hydrogen. One or more embodiments provide that each of $R^7$ and $R^8$ is a $C_1$ alkyl, e.g. methyl.

As used herein, an "alkyl" includes linear, branched and cyclic paraffin radicals that are deficient by one hydrogen. Thus, for example, a $CH_3$ group ("methyl") and a $CH_3CH_2$ group ("ethyl") are examples of alkyls.

As used herein, "aryl" includes phenyl, naphthyl, pyridyl and other radicals whose molecules have the ring structure characteristic of benzene, naphthylene, phenanthrene, anthracene, etc. It is understood that an "aryl" can be a $C_6$ to $C_{20}$ aryl. For example, a $C_6H_5$— aromatic structure is a "phenyl", a —$C_6H_4$— aromatic structure is a "phenylene".

As used herein, an "aralkyl", which can also be called an "arylalkyl", is an alkyl having an aryl pendant therefrom. It is understood that an "aralkyl" can be a $C_7$ to $C_{20}$ aralkyl. An "alkylaryl" is an aryl having one or more alkyls pendant therefrom.

As mentioned, each of $R^5$ and $R^{10}$, as shown in Formula I, can independently be a $C_1$ to $C_{20}$ alkyl, aryl, aralkyl, halide, or a hydrogen. As used herein, a "hydrocarbyl" includes aliphatic, cyclic, olefinic, acetylenic and aromatic radicals (i.e., hydrocarbon radicals) comprising hydrogen and carbon that are deficient by one hydrogen. One or more embodiments provide that each of each of $R^5$ and $R^{10}$ is a di-alkyl or tri-alkyl substituted silyl. One or more embodiments provide that each of $R^5$ and $R^{10}$ is an octyl dimethyl silyl. One or more embodiments provide that each of $R^5$ and $R^{10}$ is a halide. One or more embodiments provide that each of $R^5$ and $R^{10}$ is a fluorine.

As mentioned, each of $R^2$ and $R^{13}$, as shown in Formula I, can independently be a $C_1$ to $C_{20}$ alkyl, aryl, aralkyl or a hydrogen. One or more embodiments provide that each of $R^2$ and $R^{13}$ is a 1,1-dimethylethyl.

As mentioned, each of $R^{15}$ and $R^{16}$, as shown in Formula I, can independently be a 2,7-disubstituted carbazol-9-yl or a 3,6-disubstituted carbazol-9-yl. As used herein, a "disubstituted carbazol-9-yl" refers to a polycyclic aromatic hydrocarbon including two six-membered benzene rings fused on either side of a five-membered nitrogen-containing ring, in which the two-six membered rings are each substituted and the nitrogen (the 9-position of the carbazole ring) is the point of attachment. For instance, one or more embodiments provide that each of $R^{15}$ and $R^{16}$ is a 2,7-di-t-butlycarbazol-9-yl or a 3,6-di-t-butlycarbazol-9-yl.

As mentioned, L, as shown in Formula I, a $C_2$-$C_4$ alkylene that forms a 2-carbon bridge, 3-carbon bridge, or a 4-carbon bridge respectively, between the two oxygen atoms to which L is covalently bonded. One or more embodiments provide that L is a saturated $C_3$ alkyl.

As mentioned, each of $R^1$, $R^3$, $R^4$, $R^6$, $R^9$, $R^{11}$, $R^{12}$, and $R^{14}$, as shown in Formula I, can independently be a halide or a hydrogen. One or more embodiments provide that each of $R^1$, $R^3$, $R^4$, $R^6$, $R^9$, $R^{11}$, $R^{12}$, and $R^{14}$ is a hydrogen.

As mentioned, each X, as shown in Formula I, can independently be hydrocarbyl, halide, pseudohalide, hydroxy group, alkoxy group, phenoxy group, aryloxy group, or a hydrogen and at least one X is not a hydrocarbyl is independently. One or more embodiments provide that each X is chlorine. As used herein, a pseudohalide refers to a chemical compound that is not a halide but is a halide analog in its charge and reactivity. Examples of pseudohalides include azidos, cyanos, isocyanos, sulfanidos, thiocyanos, triflates, tosyls, and tosylates.

As shown in Formula I, the center atom is titanium (Ti).

Each of the R groups ($R^1$-$R^{16}$) and the X's of Formula I, as described herein, can independently be substituted or unsubstituted. As used herein, "substituted" indicates that the group following that term possesses at least one moiety in place of one or more hydrogens in any position, the moieties selected from such groups as halogen radicals, hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof. Being "disubstituted" refers to the presence of two or more substituent groups in any position, the moieties selected from such groups as halogen radicals, hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof.

The titanium biphenylphenol polymerization catalyst of Formula I can be made utilizing reactants mentioned herein. The titanium biphenylphenol polymerization catalyst of Formula I can be made by a number of processes, e.g. with conventional solvents, reaction conditions, reaction times, and isolation procedures, utilized for making known catalysts.

One or more embodiments provide a polymerization catalyst. The polymerization catalyst can be made by contacting, under activating conditions such as those described herein, the titanium biphenylphenol polymerization precatalyst of Formulas i, ii, iii, iv and/or v, as described herein, with an activator to provide an activated titanium biphenylphenol polymerization catalyst. Activating conditions are well known in the art.

As used herein, "activator" refers to any compound or combination of compounds, supported, or unsupported, which can activate a complex or a catalyst component, such as by creating a cationic species of the catalyst component. For example, this can include the abstraction of at least one leaving group, e.g., the "X" group described herein, from the metal center of the complex/catalyst component, e.g. the metal complex of Formula I. The activator may also be referred to as a "co-catalyst". As used herein, "leaving group" refers to one or more chemical moieties bound to a metal atom and that can be abstracted by an activator, thus producing a species active towards olefin polymerization.

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-$(CF_3)_2$phenyl)borate, Triphenylcarbenium tetrakis(3,5-$(CF_3)_2$phenyl)borate, Dimethylanilinium tetrakis(perfluoronapthyl)borate, Triphenylcarbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl)

boron, a tris(perfluoronaphthyl)boron, tris(perfluorophenyl) aluminum, a tris(perfluoronaphthyl)aluminum or any combinations thereof.

Aluminoxanes can be described as oligomeric aluminum compounds having —Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxane ("MMAO") type 3A (commercially available from Akzo Chemicals, Inc. under the trade name Modified Methylaluminoxane type 3A, discussed in U.S. Pat. No. 5,041,584). A source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and combinations thereof.

A titanium biphenylphenol polymerization catalyst made from the titanium biphenylphenol polymerization precatalyst of Formula I can be utilized to make a polymer. For instance, a titanium biphenylphenol polymerization catalyst can be contacted with an olefin under polymerization conditions to make a polymer, e.g., a polyolefin polymer.

As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. As used herein a "polymerization process" is a process that is utilized to make a polymer.

Embodiments provide that the polymer can be a polyolefin polymer. As used herein an "olefin," which may be referred to as an "alkene," refers to a linear, branched, or cyclic compound including carbon and hydrogen and having at least one double bond. As used herein, when a polymer or copolymer is referred to as comprising, e.g., being made from, an olefin, the olefin present in such polymer or copolymer is the polymerized form of the olefin. For example, when a copolymer is said to have an ethylene content of 75 wt % to 85 wt %, it is understood that the polymer unit in the copolymer is derived from ethylene in the polymerization reaction and the derived units are present at 75 wt % to 85 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a gas phase polymerization process. In another embodiment, ethylene and/or propylene can be polymerized with at least two different comonomers, optionally one of which may be a diene, to make a terpolymer.

One or more embodiments provide that the polymer can include from 1 to 100 wt % of units derived from ethylene based on a total weight of the polymer. All individual values and subranges from 1 to 100 wt % are included; for example, the polymer can include from a lower limit of 1, 5, 10, 30, 40, 50, 60, or 70 wt % of units derived from ethylene to an upper limit of 100, 99, 95, 90, or 85 wt % of units derived from ethylene based on the total weight of the polymer.

As mentioned, surprisingly, polymerization catalysts made from the titanium biphenylphenol polymerization precatalysts of Formula I can have a desirable (lower) productivity as compared to polymers made with other polymerization catalysts at similar polymerization conditions. For instance, polymerization catalysts made from the titanium biphenylphenol polymerization precatalyst of Formula I have productivities (gPE/gcat/hr) in a range from 35 to 5,000,000 gPE/gcat/hr. All individual values and subranges 35 to 5,000,000 gPE/gcat+activator/hr are included. For instance, the productive can be in a range from 35 to 5,000,000, 35 to 100,000, 35 to 50,000, 35 to 10,000, 35 to 5000, 35 to 3500, 500 to 3200, or 500 to 2300 gPE/gcat/hr, as compared to polymers made with other polymerization catalysts when both polymerizations occur at a same polymerization temperature and conditions such as a same hydrogen concentration and/or a same comonomer to monomer ratio. Without wishing to be bound by theory, it is believed that the lower productivity can desirably mitigate reactor fouling due to thermal excursions, mitigate catalyst degradation, and/or otherwise enhance operability as compared to catalysts with higher productivities at similar conditions that may lead to operability issues in a gas-phase polymerization reactor.

In addition, as mentioned, surprisingly, the titanium biphenylphenol polymerization precatalyst of Formula I can help to provide polymers having an improved, i.e., lower, molecular weight as compared to polymers made with other polymerization catalysts at similar polymerization conditions. For instance, the titanium biphenylphenol polymerization catalysts of the disclosure can help to provide polymers having a decreased molecular weight, as compared to polymers made with other polymerization catalysts when both polymerizations occur at a same polymerization temperature and conditions such as a same hydrogen concentration and/or a same comonomer to monomer ratio. Embodiments provide that the polymer can have a Mw (weight average molecular weight) from 60,000 to 350,000. All individual values and subranges from 60,000 to 350,000 are included; for example, the polymer can have a Mw from a lower limit of 60,000; 100,000; 102,000, or 105,000 to an upper limit of 350,000, 336,000; 286,000; 273,000; 203,000; or 110,000. Mw can be determined by GPC, described below. Without wishing to be bound by theory, it is believed that lower molecular weight polymers are easier to process than high molecular weight polymers due to lower viscosities in molten phase.

Embodiments provide that the polymer can have a melt index ($I_2$) as measured by D1238 (at 190° C., 2.16 kg load) in the range from 0.001 g/10 min to 1000 g/10 min. All individual values and subranges from 0.001 g/10 min to 1000 g/10 min are included. For instance, the polymers can have a melt index from 0.001 g/10 min to 1000 g/10 or 500 g/10 min, from 0.1 g/10 min to 100 g/10 min, or from 0.005 g/10 min to 1.9 g/10 min.

Embodiments provide that the polymer can have a melt index ($I_5$) as measured by D1238 (at 190° C., 5 kg load) in the range from 0.001 g/10 min to 1000 g/10 min. All individual values and subranges from 0.001 g/10 min to 1000 g/10 min are included. For instance, the polymers can have a melt index ($I_5$) from 0.02 g/10 min to 5 g/10 min.

Embodiments provide that the polymer can have a melt index ($I_{21}$) as measured by D1238 (at 190° C., 21 kg load) in the range from 0.001 g/10 min to 1000 g/10 min. All individual values and subranges from 0.001 g/10 min to 1000 g/10 min are included. For instance, the polymers can have a melt index ($I_{21}$) from 0.001 g/10 min to 53 g/10 min.

Embodiments provide that the polymer can have a Mn (number average molecular weight) from 5,000 to 98,000. All individual values and subranges from 5,000 to 98,000 are included; for example, the polymer can have a Mn from a lower limit of 5,000; 6,000; 16,000; or 28,000 to an upper limit of 98,000; 75,000; 69,000; 55,000; 45,000; or 35,000. Mn can be determined by gel permeation chromatography (GPC), as is known in the art.

Embodiments provide that the polymer can have a molecular weight distribution, determined as Mw/Mn (weight average molecular weight/number average molecular weight) or from 2.90 to 21.00. All individual values and subranges from 2.90 to 21.00 are included; for example, the polymer can have a Mw/Mn from a lower limit of 2.90; 3.00; 3.50; 4.00; or 4.50 to an upper limit of 21.00; 20.00; 8.00; 7.50; 7.00; or 6.50. In some embodiments the Mw/MN can be in a range from 2.90 to about 4.00. Mw/Mn can be determined by GPC analysis, as described below.

Embodiments provide that the polymer can have a melting temperature from 100 to 165° C. All individual values and subranges from 100 to 165° C. are included; for example, the polymer can have a melting temperature from a lower limit of 100, 105, or 110° C. to an upper limit of 165, 160, or 155° C. Melting temperature can be determined via Differential Scanning Calorimetry according to ASTM D 3418-08.

Embodiments provide that the polymer can have a density of from 0.890 g/cm³ to 0.970 g/cm³. All individual values and subranges from 0.890 to 0.970 g/cm³ are included; for example, the polymer can have a density from a lower limit of 0.890, 0.900, 0.910, or 0920 g/cm³ to an upper limit of 0.970, 0.960, 0.950, or 0.940 g/cm³. Density can be determined in accordance with ASTM D-792-13, *Standard Test Methods for Density and Specific Gravity(Relative Density) of Plastics by Displacement*, Method B (for testing solid plastics in liquids other than water, e.g., in liquid 2-propanol). Report results in units of grams per cubic centimeter (g/cm³).

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (µL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X+1} + \frac{a_{PS}+1}{a_X+1}\log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW)

on the y-axis versus Log(MW) on the x-axis to give a GPC chromatogram, wherein Log(MW) and dW/d Log(MW) are as defined above.

The polymer can be utilized for a number of articles such as films, fibers, nonwoven and/or woven fabrics, extruded articles, and/or molded articles, among others.

Also provided is a bimodal catalyst system comprising the titanium biphenylphenol polymerization precatalysts of Formula I or an activation reaction product thereof and at least one olefin polymerization catalyst (second catalyst) that is not the titanium biphenylphenol polymerization precatalysts of Formula I or an activation reaction product thereof. Such a second catalyst may be a Ziegler-Natta catalyst, a chromium-based catalyst (e.g., a so-called Phillips catalyst), a metallocene catalyst that contains or is free of an indenyl ring (e.g., a metallocene catalyst that contains unsubstituted and/or alkyl-substituted cyclopentadienyl rings), a Group 15 metal-containing catalyst compound described in paragraphs [0041] to [0046] of WO 2018/064038 A1, or a biphenyl phenolic catalyst compound described in paragraphs [0036] to [0080] of US20180002464A1.

The titanium biphenylphenol polymerization precatalysts of Formula I, as well as other components discussed herein such as the activator and/or an additional polymerization component, may be utilized with a support. A "support", which may also be referred to as a "carrier", refers to any support material, including a porous support material, such as talc, inorganic oxides, and inorganic chlorides.

The titanium biphenylphenol polymerization precatalysts of Formula I, as well as other components discussed herein, can be supported on the same or separate supports, or one or more of the components may be used in an unsupported form. Utilizing the support may be accomplished by any technique used in the art. One or more embodiments provide that a spray dry process is utilized. Spray dry processes are well known in the art. The support may be functionalized.

The support may be a porous support material, for example, talc, an inorganic oxide, or an inorganic chloride. Other support materials include resinous support materials, e.g., polystyrene, functionalized or crosslinked organic supports, such as polystyrene divinyl benzene polyolefins or polymeric compounds, zeolites, clays, or any other organic or inorganic support material and the like, or mixtures thereof.

Support materials include inorganic oxides that include Group 2, 3, 4, 5, 13 or 14 metal oxides. Some preferred supports include silica, fumed silica, alumina, silica-alumina, and mixtures thereof. Some other supports include magnesia, titania, zirconia, magnesium chloride, montmorillonite, phyllosilicate, zeolites, talc, clays) and the like. Also, combinations of these support materials may be used, for example, silica-chromium, silica-alumina, silica-titania and the like. Additional support materials may include porous acrylic polymers, nanocomposites, aerogels, spherulites, and polymeric beads.

An example of a support is fumed silica available under the trade name Cabosil™ TS-610, or other TS- or TG-series supports, available from Cabot Corporation. Fumed silica is typically a silica with particles 7 to 30 nanometers in size that has been treated with dimethylsilyldichloride such that a majority of the surface hydroxyl groups are capped.

The support material may have a surface area in the range of from about 10 to about 700 m/g, pore volume in the range of from about 0.1 to about 4.0 g/cm$^3$ and average particle size in the range of from about 5 to about 500 μm. More preferably, the surface area of the support material is in the range of from about 50 to about 500 m/g, pore volume of from about 0.5 to about 3.5 g/cm$^3$ and average particle size of from about 10 to about 200 μm. Most preferably the surface area of the support material is in the range is from about 100 to about 400 m/g, pore volume from about 0.8 to about 3.0 g/cm$^3$ and average particle size is from about 5 to about 100 μm. The average pore size of the carrier typically has pore size in the range of from 10 to 1000A, preferably 50 to about 500A, and most preferably 75 to about 350A.

A molar ratio of metal in the activator to metal in the titanium biphenylphenol polymerization precatalyst of Formula I may be 1000:1 to 0.5:1, 300:1 to 1:1, or 150:1 to 1:1. One or more diluents, e.g., fluids, can be used to facilitate the combination of any two or more components. For example, the titanium biphenylphenol polymerization precatalyst of Formula I and the activator can be combined together in the presence of toluene or another non-reactive hydrocarbon or hydrocarbon mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the mixture or the titanium biphenylphenol polymerization catalyst/activator can be added to the support. The slurry may be fed to the reactor for the polymerization process, and/or the slurry may be dried, e.g., spay-dried, prior to being fed to the reactor for the polymerization process.

The polymerization process may utilize using known equipment and reaction conditions, e.g., known polymerization conditions. The polymerization process is not limited to any specific type of polymerization system. As an example, polymerization temperatures may range from about 0° C. to about 300° C. at atmospheric, sub-atmospheric, or super-atmospheric pressures. Embodiments provide a method of making a polyolefin polymer the method comprising: contacting, under polymerization conditions, an olefin with the titanium biphenylphenol polymerization catalysts, as described herein, to polymerize the olefin, thereby making a polyolefin polymer.

One or more embodiments provide that the polymers may be made via a gas phase polymerization system, at super-atmospheric pressures in the range from 0.07 to 68.9 bar, from 3.45 to 27.6 bar, or from 6.89 to 24.1 bar, and a temperature in the range from 30° C. to 130° C., from 65° C. to 110° C., from 75° C. to 120° C., or from 80° C. to 120° C. For one or more embodiments, the temperature may be 80° C., 90° C., or 100° C. Stirred and/or fluidized bed gas phase polymerization systems may be utilized.

Generally, a conventional gas phase fluidized bed polymerization process can be conducted by passing a stream containing one or more olefin monomers continuously through a fluidized bed reactor under reaction conditions and in the presence of a catalytic composition, e.g., a composition including the activated titanium biphenylphenol polymerization precatalysts of Formula I, at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalytic composition and reactants may also be present in the gas stream. The polymerization system may include a single reactor or two or more reactors in series, for example.

Feed streams for the polymerization process may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single or multiple and different locations.

For the polymerization process, polymerization catalyst may be continuously fed to the reactor. A gas that is inert to the polymerization catalyst, such as nitrogen or argon, can be used to carry the polymerization catalyst into the reactor bed.

In one embodiment, the polymerization catalyst can be provided as a slurry in mineral oil or liquid hydrocarbon or mixture such, as for example, propane, butane, isopentane, hexane, heptane or octane. The slurry may be delivered to the reactor with a carrier fluid, such as, for example, nitrogen or argon or a liquid such as for example isopentane or other $C_3$ to $C_8$ alkanes.

For the polymerization process, hydrogen may be utilized at a gas mole ratio of hydrogen to ethylene in the reactor that can be in a range of about 0.0 to 1.0, in a range of 0.01 to 0.7, in a range of 0.03 to 0.5, or in a range of 0.005 to 0.4. A number of embodiments utilize hydrogen gas. In some embodiments the gas mole ratio of hydrogen to ethylene in the reactor can be 0.0068, 0.0016, or 0.0011.

A number of aspects of the present disclosure are provided as follows.

Aspect 1 provides a titanium biphenylphenol polymerization precatalyst of Formula I:

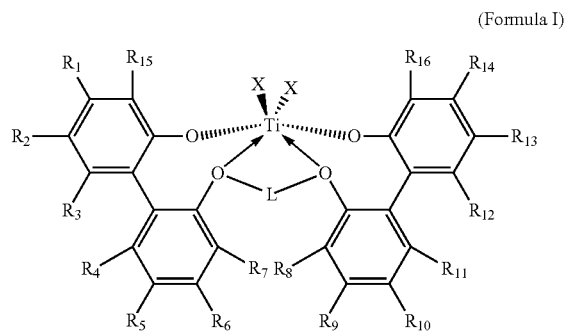

(Formula I)

wherein each of $R^7$ and $R^8$ is independently a $C_1$ to $C_{20}$ alkyl, aryl, aralkyl or a hydrogen; wherein each of $R^5$ and $R^{10}$ is independently a $C_1$ to $C_{20}$ alkyl, aryl, aralkyl, halide, or a hydrogen; wherein each of $R^2$ and $R^{13}$ is independently a $C_1$ to $C_{20}$ alkyl, aryl, aralkyl or a hydrogen; wherein each of $R^{15}$ and $R^{16}$ is a 2,7-disubstituted carbazol-9-yl or a 3,6-disubstituted carbazol-9-yl; wherein L is a $C_2$-$C_4$ alkylene that forms a 2-carbon bridge, 3-carbon bridge, or a 4-carbon bridge respectively, between the two oxygen atoms to which L is covalently bonded; wherein each of $R^1$, $R^3$, $R^4$, $R^6$, $R^9$, $R^{11}$, $R^{12}$, and $R^{14}$ is independently a halide or a hydrogen; and wherein each X is independently a hydrocarbyl, halide, pseudohalide, hydroxy group, alkoxy group, phenoxy group, aryloxy group, or a hydrogen and at least one X is not a hydrocarbyl.

Aspect 2 provides the precatalyst of aspect 1, wherein each of $R^7$ and $R^8$ is a $C_1$ alkyl or each of $R^7$ and $R^8$ is a hydrogen.

Aspect 3 provides the precatalyst of aspect 1 or 2, wherein each of $R^5$ and $R^{10}$ is a di-alkyl or tri-alkyl substituted silyl.

Aspect 4 provides the precatalyst of aspect 1, wherein each of $R^5$ and $R^{10}$ is an octyl dimethyl silyl.

Aspect 5 provides the precatalyst of aspect 1 or 2, wherein each of $R^5$ and $R^{10}$ is fluorine.

Aspect 6 provides the precatalyst any one of aspects 1-5, wherein each of $R^2$ and $R^{13}$ is a 1,1-dimethylethyl.

Aspect 7 provides precatalyst of any one of aspects 1-6, wherein each of $R^{15}$ and $R^{16}$ is a 2,7-di-t-butlycarbazol-9-yl or a 3,6-di-t-butlycarbazol-9-yl.

Aspect 8 provides the precatalyst of any one of aspects 1-7, wherein L is a saturated $C_3$ alkylene.

Aspect 9 provides the precatalyst of any one of Aspects 1-8, wherein each X is chlorine.

Aspect 10 provides the precatalyst of any one of aspects 1-9, further comprising a silica support that is free of activator, wherein the activator-free silica support supports the precatalyst.

Aspect 11 provides a method of making a titanium biphenylphenol polymerization catalyst, the method comprising contacting, under activating conditions, a titanium biphenylphenol polymerization precatalyst of Formula I of any one of aspects 1 to 10 with an activator so as to activate the titanium biphenylphenol polymerization precatalyst of Formula I, thereby making the titanium biphenylphenol polymerization catalyst.

Aspect 12 provides the method of aspect 11, further comprising contacting an activator-free solution of the titanium biphenylphenol polymerization precatalyst of Formula I dissolved in an alkane solvent with a silica support containing thereon a spray-dried activator to make the titanium biphenylphenol polymerization catalyst on a silica support.

Aspect 13 provides a titanium biphenylphenol polymerization catalyst made by the method of aspect 11 or 12.

Aspect 14 provides a method of making a polyethylene, the method comprising polymerizing an olefin monomer in a single gas-phase polymerization reactor in presence of the titanium biphenylphenol polymerization catalyst of aspect 13 to make a polyethylene composition.

Aspect 15 provides the method of aspect 14, before the polymerizing step, further comprising making the titanium biphenylphenol polymerization catalyst; and feeding the titanium biphenylphenol polymerization catalyst into the single gas-phase polymerization reactor.

EXAMPLES

Titanium biphenylphenol polymerization precatalyst of Formula (i) is prepared as follows. In a glove box, a 40 milliliter (mL) oven-dried glass vial was charged with a ligand of Formula A (0.500 gram, 0.407 mmol), diethyl ether [Et2O] (20 mL; available from Fisher Scientific) and a magnetic stir bar. The ligand of Formula A (2',2"-(propane-1,3-diylbis(oxy))bis(3-(3,6-di-tert-butyl-9Hcarbazol-9-yl)-5'-fluoro-5-(2,4,4-trimethylpentan-2-yl)biphenyl-2-ol) was prepared as described in WO 2012/027,448, and the entire contents of WO 2012/027,448 are incorporated herein by reference. The contents of the vial were allowed to stir until the ligand of Formula A was dissolved and then the contents of the vial were cooled to approximately −30 degrees Celsius (° C.). Then titanium(IV) chloride [TiCl4] (45 μL, 0.407 mmol; available from Aldrich) was slowly added to the stirring solution of ligand to form a mixture. Immediate color change to deep red was observed and then the mixture was allowed to stir at room temperature overnight. The solvent was removed in vacuo and the resulting residue suspended in cold pentane and then filtered to give a red solid that was washed with pentane (0.55 g, 100% yield). The presence of the titanium biphenylphenol polymerization precatalyst of Formula i was confirmed by $^1$H NMR analysis. $^1$H NMR (400 MHz, C$_6$D$_6$) δ8.60 (d, J=1.9 Hz, 2H), 8.40 (d, J=1.9 Hz, 2H), 7.77-7.57 (m, 6H), 7.49 (d, J=2.4 Hz, 2H), 7.40 (d, J=8.6 Hz, 2H), 7.22 (d, J=2.4 Hz, 2H), 6.91 (dd, J=8.5, 3.2 Hz, 2H), 6.18-6.03 (m, 2H), 5.78 (dd, J=9.4, 4.5 Hz, 2H), 3.86 (d, J=8.2 Hz, 2H), 3.56-3.39 (m, 2H), 1.54 (s, 18H), 1.49-1.43 (m, 6H), 1.37 (s, 18H), 1.11 (s, 6H), 1.08 (s, 6H), 0.76 (s, 18H). $^{13}$C NMR (101 MHz, C$_6$D$_6$) δ214.97, 192.01, 160.72, 157.64, 152.98, 146.21, 143.93, 143.54, 140.88, 140.81, 131.64, 127.12, 126.19, 126.04, 125.79, 123.84, 123.59, 119.12, 118.89, 117.80, 116.76, 116.56, 111.58, 109.82, 57.49, 38.81, 35.36, 35.17, 34.79, 32.83, 32.68, 32.57, 32.44, 32.33, 32.10, 31.29, 29.54, 23.07, 14.62.). $^{19}$F NMR (376 MHz, C$_6$D$_6$) δ122.45.

pentan-2-yl)-[1,1'-biphenyl]-2-ol) was prepared as described in WO2014/105411, and the entire contents of WO2014/105411 are incorporated herein by reference. The presence of titanium biphenylphenol polymerization precatalyst of Formula (ii) was confirmed by $^1$H NMR analysis. $^1$H NMR (400 MHz, C$_6$D$_6$) δ8.12 (dd, J=37.8, 8.2 Hz, 4H), 7.93—7.73 (m, 6H), 7.46 (ddd, J=21.2, 8.2, 1.6 Hz, 4H), 7.31 (d, J=2.5 Hz, 2H), 6.78 (dd, J=8.9, 3.2 Hz, 2H), 6.05 (dd, J=8.3, 3.1 Hz, 2H), 3.86 (dt, J=10.4, 5.1 Hz, 2H), 3.16 (dt, J=11.0, 5.6 Hz, 2H), 1.67 (d, J=14.5 Hz, 2H), 1.58 (s, 18H), 1.52 (d, J=14.5 Hz, 2H), 1.36 (s, 18H), 1.31 (2, 6H). 1.18 (s, 6H), 1.13 (s, 6H), 0.84 (s, 18H). $^{13}$C NMR (101 MHz, C$_6$D$_6$) δ161.92, 159.49, 157.44, 153.97, 153.94, 150.79, 149.78, 149.05, 148.03, 144.45, 142.91, 142.58, 142.52, 134.78, 134.69, 133.98, 133.89, 132.75, 128.88, 127.43, 126.72, 124.61, 121.47, 120.72, 120.11, 119.86, 118.71, 118.45, 118.39, 118.23, 117.41, 117.18, 110.27, 108.65, 76.43, 57.94, 38.84, 35.87, 35.81, 33.42, 33.03, 32.74, 32.36, 32.32, 32.16, 29.96, 29.63, 17.71.

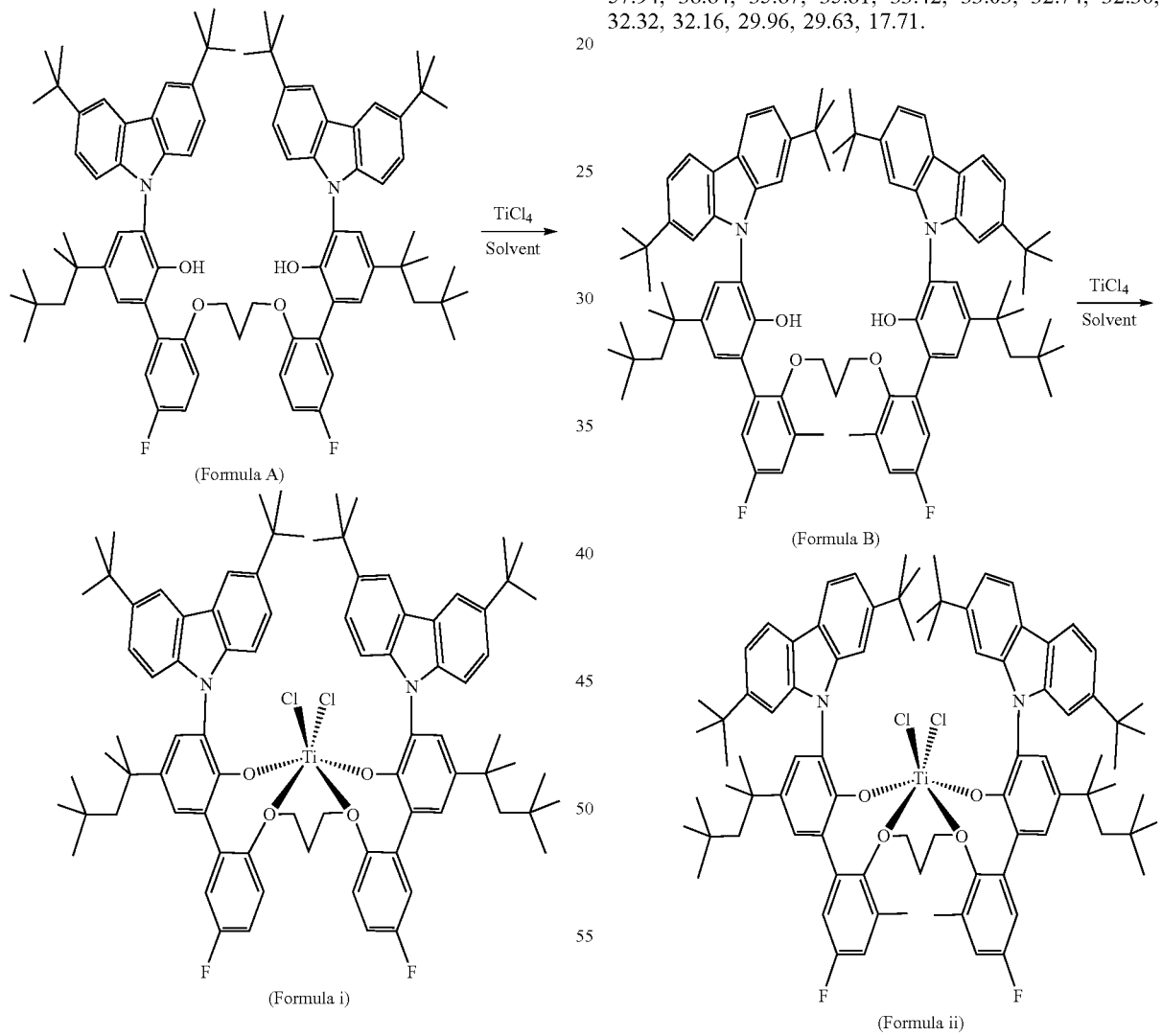

(Formula A)

(Formula B)

(Formula i)

(Formula ii)

Titanium biphenylphenol polymerization precatalyst of Formula (ii) was prepared using the same components and methodology as titanium biphenylphenol polymerization precatalyst of Formula i, but with the use of the ligand of Formula B (0.500 g, 0.398 mmol) instead of the ligand of Formula A (0.087 g; 16% yield). The ligand of Formula B (2',2''-(propane-1,3-diylbis(oxy))bis(3-(2,7-di-tert-butyl-9H-carbazol-9-yl)-5'-fluoro-3'-methyl-5-(2,4,4-trimethyl- Titanium biphenylphenol polymerization precatalyst of Formula (iii) was prepared as using the same components and methodology as the titanium biphenylphenol polymerization precatalyst of Formula i, but with the use of the ligand of Formula C (4.000 g, 2.563 mmol) instead of the ligand of Formula A (1.098 g, 26% yield) and pentane (available from Sigma Aldrich) as the solvent. The ligand of Formula C was prepared as described in WO 2017/058,981, and the entire contents of WO 2017/058,981 are incorporated herein by reference. The presence of titanium biphenylphenol polymerization precatalyst of Formula (iii) was confirmed by $^1$H NMR analysis. $^1$H NMR (400 MHz, $C_6D_6$) δ8.15 (d, J=8.2 Hz, 2H), 8.04-7.94 (m, 4H), 7.84 (dd, J=14.6, 2.1 Hz, 4H), 7.67 (d, J=2.5 Hz, 2H), 7.53-7.45 (m, 4H), 7.36 (dd, J=8.3, 1.6 Hz, 2H), 7.08 (d, J=1.6 Hz, 2H), 4.13 (dt, J=10.6, 5.2 Hz, 2H), 3.43 (dt, J=10.9, 5.6 Hz, 2H), 1.77 (d, J=14.5 Hz, 2H), 1.65 (s, 6H), 1.64 (d, J=13.5 Hz, 2H), 1.63-1.58 (m, 2H), 1.61 (s, 18H), 1.37 (s, 6H), 1.32 (s, 18H), 1.44-1.17 (m, 24H), 0.94-0.84 (m, 4H), 0.91 (s, 18H), 0.60 (t, J=7.7 Hz, 4H), 0.09 (s, 6H), 0.08 (s, 6H). $^{13}$C NMR (101 MHz, $C_6D_6$) δ158.73, 157.86, 150.50, 147.87, 144.02, 142.62, 142.54, 139.05, 137.49, 137.41, 134.32, 131.92, 131.53, 129.05, 127.37, 126.34, 124.61, 121.42, 120.74, 119.91, 119.87, 118.26, 110.29, 108.71, 76.14, 58.12, 38.93, 35.82, 34.40, 33.37, 32.75, 32.71, 32.39, 32.10, 30.31, 30.14, 30.12, 29.78, 24.71, 23.45, 17.88, 16.27, 14.74, −2.66, −2.75.

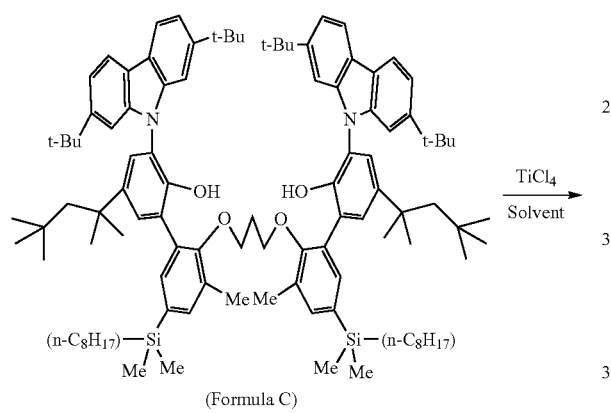

(Formula C)

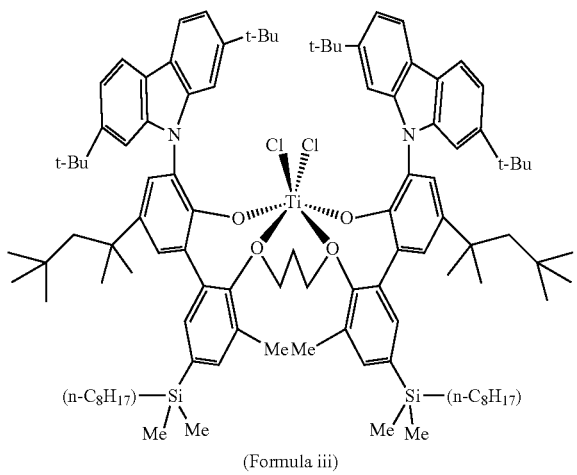

(Formula iii)

As used herein, "Me" refers to methyl and "t-Bu" refers to tert-butyl.

Comparative polymerization precatalysts of Formulas (iv) and (v) were prepared as described in WO 2017/058981 A1, and the entire contents of WO 2017/058981 A1 are incorporated herein by reference.

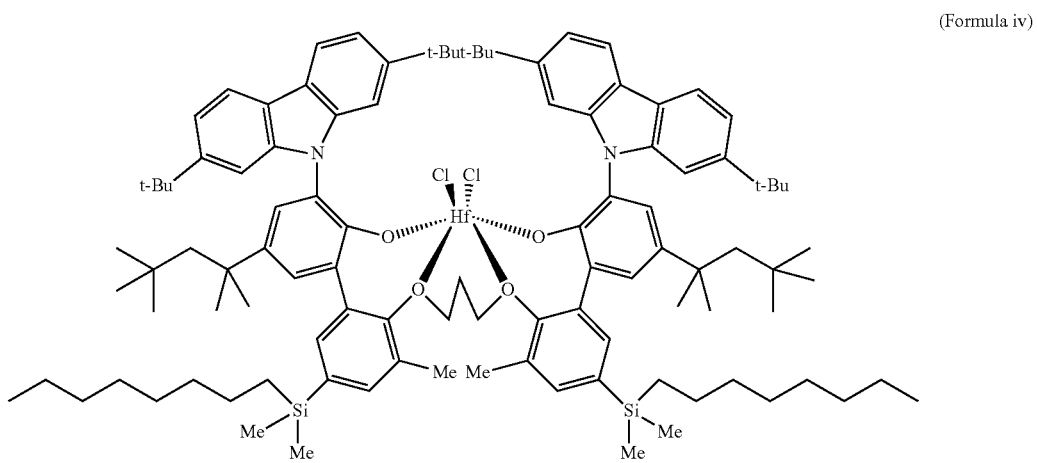

(Formula iv)

(Formula v)

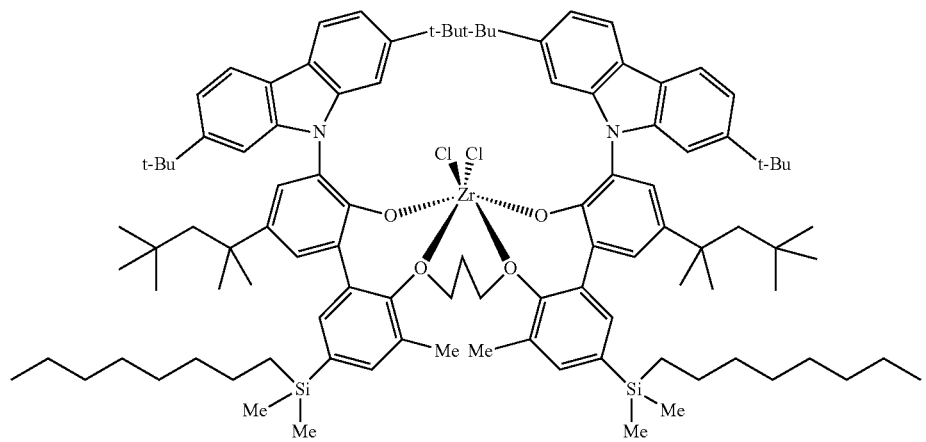

Activation of the titanium biphenylphenol polymerization precatalysts of Formulas i, ii, iii, iv, and v was performed by either Method I or Method II as detailed below.

Method I

Example 1 (EX1), an activated titanium biphenylphenol polymerization catalyst of Formula I, was prepared in accordance with Method I as follows. In a nitrogen-purged glove box an oven-dried glass bottle was charged with 2.65 gram (g) of treated fumed silica (CABOSIL TS-610; available from W.R. Grace) slurried in 75 g of toluene (available from Aldrich), and a stir bar and stirred until well dispersed. 22 g of a 10% solution by weight of methylaluminoxane (MAO) (available from W.R. Grace as 10 wt % in toluene) was added to the bottle to form a mixture. The mixture was stirred magnetically for 15 minutes, then the titanium biphenylphenol polymerization catalyst of Formula III (0.303 g) was added and the mixture was stirred for 30-60 minutes. The mixture was spray-dried using a Buchi Mini Spray Dryer B-290 with the following parameters to yield the dried and activated titanium biphenylphenol polymerization catalyst of Example 1: Set Temperature—185° C., Outlet Temperature—100° C. (min.), Aspirator—95 and Pump Speed—150 rpm.

Example 2 (EX2) was prepared the same as Example 1 with the change that the catalyst of Example 2 was utilized, as indicated in Table 1.

Example 3 (EX3), was prepared the same as Example 1 with the change that the catalyst of Example 3 was utilized, as indicated in Table 1.

Method II:

Examples 4-11 (EX4-11), activated titanium biphenylphenol polymerization catalysts of Formula I, and the catalysts of the Comparative Examples 1-7 (CE1-7) were prepared in accordance with Method II as follows.

For Example 4, a 0.9 mg/mL suspension of titanium biphenylphenol polymerization precatalyst of Formula iii in hexanes (a: 1.3 mg, 0.21 mL, 0.75 µmol Ti; b: 2.5 mg, 0.42 mL, 1.5 µmol; available from Aldrich) was injected as an activator-free solution into a bomb containing activator in the form of spray-dried methylaluminoxane in the amount shown in Table 1 (e.g., 0.0015 g) to make the activated and supported titanium biphenylphenol polymerization catalyst of Example 4.

The activated titanium biphenylphenol polymerization catalysts of Examples 5-11, were prepared as Example 4 with the change that the respective catalysts and amounts of catalysts of Examples 5-11 were utilized, as indicated in Table 1.

The activated catalysts of Comparative Examples 1-7 were prepared as Example 4 with the change that the respective catalysts and amounts of catalysts of Comparative Examples 1-7 were utilized, as indicated in Table 1.

Titanium Titanium

Ethylene/1-hexene copolymerizations of EX 1-11, CE 1-7 were conducted in the gas-phase in a 2L semi-batch autoclave polymerization reactor equipped with a mechanical agitator as follows. The reactor was first dried for 1 hour, charged with 200 g of sodium chloride (NaCl) and dried by heating at 100° C. under nitrogen for 30 minutes. After drying, 5 g of silica supported methylaluminoxane (SMAO) was introduced as a scavenger under nitrogen pressure. After adding the SMAO, the reactor was sealed and components were stirred. The reactor was then charged with hydrogen ($H_2$ preload, as indicated below for each condition) and hexene (C6/C2 ratio, as indicated below for each condition), then pressurized with ethylene (230 psi). Once the system reached a steady state, the type and amount of respective activated catalyst (activated via Method I or II) as identified by Table 1 for each of Examples 1-11 and Comparative Examples 1-7 was charged into the reactor at 80° C. to start polymerization. The reactor temperature was brought to 90 or 100° C. and maintained at this temperature throughout the 1 hour run. The runs were conducted at Condition 1, 2, 3, or 4, as identified in Table 1 and detailed below. At the end of the run, the reactor was cooled down, vented and opened. The resulting product mixture was washed with water and methanol, then dried. The results for Examples 1-11 and Comparative Examples 1-7 are shown in Table 2.

Productivity (grams polymer/grams catalyst/hour) was determined as the ratio of polymer produced to the amount of catalyst and activator added to the reactor.

Mn (number average molecular weight), Mw (weight average molecular weight), z-average molecular weight (Mz), and Mw/Mn (weight average molecular weight/number average molecular weight) are determined by gel permeation chromatography (GPC), as is known in the art.

Comonomer content (i.e., 1-hexene) incorporated in the polymers (weight %)) was determined by rapid FT-IR spectroscopy on the dissolved polymer in a GPC measurement.

Melt index (MI, $I_2$) can be measured in accordance with ASTM D1238 (at 190° C., 2.16 kg weight). Melt index (MI, $I_5$) can be measured in accordance with ASTM D1238 (190° C., 5 kg). Melt index (MI, $I_{21}$) can be measured in accordance with ASTM D1238 (190° C., 21.6 kg).

Condition 1: $C_6/C_2$ ratio=0.004, $H_2$ preload=5.02 liter (L), $H_2/C_2$ ratio=0.0068, $C_2$ pressure=230 pounds per square inch (psi); Condition 2: $C_6/C_2$ ratio=0.004, $H_2$ preload=1.18 L, $H_2/C_2$ ratio=0.0016, $C_2$ pressure=230 psi; Condition 3: $C_6/C_2$ ratio=0.016, $H_2$ preload=0.81 L, $H_2/C_2$ ratio=0.0011, $C_2$ pressure=230 psi; Condition 4: C6/C2 ratio=0.016, $H_2$ preload=0.40 L, $H_2/C_2$=0.0011, $C_2$ pressure=115 psi.

have a Mw of 259,109 and 202,837, respectively, as compared to a Mw of 105,215 and 102,243 of EX. 4 and EX5, respectively. That is, the Mw of the resultant polymers from the titanium biphenylphenol polymerization catalysts of the disclosure can be at least 40 percent less than the Mw of comparative polymers, and yet the titanium biphenylphenol polymerization catalysts provide other desired properties (Mn, Mz, Mw/Mn ratio, % comonomer incorporation, $I_2$, $I_5$, $I_{21}$, Yield, and/or Productivity).

TABLE 1

| | Catalyst Type | M | Catalyst method | Activator (g) | Condition | Catalyst Charge (g) | Yield (g) | Productivity (gPE/gcat/hr) |
|---|---|---|---|---|---|---|---|---|
| EX 1 | III | Ti | I | *** | 1 | 102 | 3.59 | 35 |
| EX 2 | I | Ti | I | *** | 1 | 201 | 22.8 | 113 |
| EX 3 | I | Ti | I | *** | 2 | 201 | 45.6 | 227 |
| CE 1 | IV | Zr | II | *** | 1 | 0.0011 | 58.2 | 52,908 |
| CE 2 | V | Hf | II | *** | 1 | 0.0019 | 67.6 | 35,575 |
| CE 3 | IV | Zr | II | *** | 2 | 0.0009 | 56.2 | 62,441 |
| CE 4 | IV | Zr | II | *** | 3 | 0.0011 | 47 | 42,724 |
| CE 5 | V | Hf | II | *** | 3 | 0.0033 | 30 | 9,090 |
| CE 6 | IV | Zr | II | *** | 4 | 0.0009 | 76.6 | 85,106 |
| CE 7 | V | Hf | II | *** | 4 | 0.0023 | 43.4 | 18,869 |
| EX 4 | III | Ti | II | 15 | 1 | 0.0013 | 28.4 | 1,742 |
| EX 5 | III | Ti | II | 30 | 1 | 0.0025 | 75.6 | 2,326 |
| EX 6 | III | Ti | II | 15 | 2 | 0.0013 | 28.4 | 1,742 |
| EX 7 | III | Ti | II | 30 | 2 | 0.0025 | 105 | 3,237 |
| EX 8 | III | Ti | II | 15 | 3 | 0.0013 | 27.6 | 1,693 |
| EX 9 | III | Ti | II | 30 | 3 | 0.0025 | 51 | 1,569 |
| EX 10 | III | Ti | II | 15 | 4 | 0.0013 | 8.19 | 502 |
| EX 11 | III | Ti | II | 30 | 4 | 0.0025 | 56.4 | 1,735 |

TABLE 2

| | Mn | Mw | Mz | Mw/Mn | % comonomer | $I_2$ (g/10 min) | $I_5$ (g/10 min) | $I_{21}$ (g/10 min) |
|---|---|---|---|---|---|---|---|---|
| EX 1 | NT | NT | NT | NT | NT | NT | NT | NT |
| EX 2 | 16,496 | 336,095 | 6,049,363 | 20.37 | 3.87 | 0.050 | 0.631 | 20.804 |
| EX 3 | 24,875 | 193,132 | 5,574,109 | 7.76 | 4.59 | 1.490 | 5.387 | 53.006 |
| CE 1 | 41,063 | 259,109 | 2,328,120 | 6.31 | 0.96 | 0.132 | 0.464 | 5.631 |
| CE 2 | 53,429 | 202,837 | 936,166 | 3.80 | 0.83 | 0.166 | 0.478 | 3.808 |
| CE 3 | 90,645 | 484,465 | 2,695,083 | 5.34 | 1.71 | No Flow | No Flow | No Flow |
| CE 4 | 50,423 | 211,212 | 1,377,114 | 4.19 | 5.35 | 0.960 | 0.333 | 3.922 |
| CE 5 | 139,723 | 530,760 | 1,481,454 | 3.80 | 6.14 | No Flow | No Flow | No Flow |
| CE 6 | 47,509 | 163,655 | 893,548 | 3.44 | 6.31 | 0.328 | 0.770 | 7.829 |
| CE 7 | 150,180 | 560,022 | 1,639,357 | 3.73 | 5.17 | No Flow | No Flow | No Flow |
| EX 4 | 28,105 | 105,215 | 768,578 | 3.74 | 2.01 | 1.832 | 5.18 | 39.485 |
| EX 5 | 34,001 | 102,243 | 424,701 | 3.01 | 1.20 | 1.848 | 5.200 | 38.658 |
| EX 6 | 98,107 | 286,738 | 1,503,507 | 2.92 | 0.86 | No Flow | 0.096 | 0.894 |
| EX 7 | 66,883 | 255,873 | 1,431,056 | 3.83 | 0.77 | No Flow | No Flow | No Flow |
| EX 8 | 58,943 | 175,549 | 1,439,911 | 2.98 | 2.21 | 0.26 | 0.82 | 6.884 |
| EX 9 | 62,581 | 191,881 | 1,221,476 | 3.07 | 2.30 | 0.155 | 0.482 | 4.108 |
| EX 10 | 69,497 | 273,211 | 2,496,482 | 3.93 | 2.52 | 0.062 | 0.231 | 2.458 |
| EX 11 | 63,794 | 203,713 | 1,744,033 | 3.19 | 3.07 | 0.127 | 0.421 | 3.887 |

"NT" the test was not conducted.

As detailed in Table 1 and Table 2, EX1-11 provide for titanium biphenylphenol polymerization catalysts and resultant polymers having suitable properties.

The titanium biphenylphenol polymerization catalysts of the disclosure can produce lower molecular weight polymers than polymers from comparative catalyst. For example, at Condition 1 and catalyst addition Method II, CE1 and CE2

For instance, the titanium biphenylphenol polymerization catalysts of the disclosure can have a lower productivity than the comparative catalysts. As detailed in Table 1, EX4-11 all have lower productivities than the productivities of CE1-7. Without wishing to be bound by theory, it is believed that the lower productivity can desirably mitigate catalyst degradation and/or otherwise enhance operability as compared to catalysts with higher productivities that may lead to operability issues in a gas-phase polymerization reactor.

In addition, EX4-11 demonstrate operability of titanium biphenylphenol polymerization catalysts of the disclosure can be improved by employing catalyst addition Method II instead of catalyst addition Method I. At Condition 1 and Condition 2, EX4-11 (Method II) provides higher Yield and/or Productivity than when the same or similar titanium catalyst is employed in Method I (EX1-3). Without wishing to be bound by theory, it is believe that employing Method II mitigates catalyst degradation, as compared to other approaches (e.g., conventionally supported/slurry) such as in Method I which contact the activator and the precatalyst in a mixture prior to spray drying the mixture to make an activated catalyst and thus permitting a substantial amount of time for the catalyst to degrade once formed. Stated differently, EX4-11 which employ Method II utilize a solution that is activator-free (without any activator) until the solution is later contacted with an activator such as a spray-dried activator to make the activated catalyst which can then be feed directly/immediately into the gas-phase polymerization reactor (e.g., as a trim catalyst) to mitigate any catalyst degradation and thereby improve operability. For instance, the catalyst can be fed directly into the gas-phase polymerization reactor via an in-line trim addition or other mechanism immediately following formation of an activated titanium biphenylphenol polymerization catalyst via Method II, as described herein.

The titanium biphenylphenol polymerization catalysts of the disclosure desirably incorporate less comonomer (1-hexene). For instance, at Condition 3, CE4 and CE5 have a commoner incorporation of 5.35 and 6.14 percent, respectively, as compared to a comonomer incorporation of 2.98 and 3.07 for EX8 and EX9, respectively. That is, the comonomer incorporation of the resultant polymers from the titanium biphenylphenol polymerization catalysts of the disclosure can be at least 65 percent less than the comonomer incorporation of the comparative catalysts employed at the same condition (Condition 2, 3, and 4) and catalyst method.

What is claimed is:

1. A titanium biphenylphenol polymerization precatalyst of Formula I:

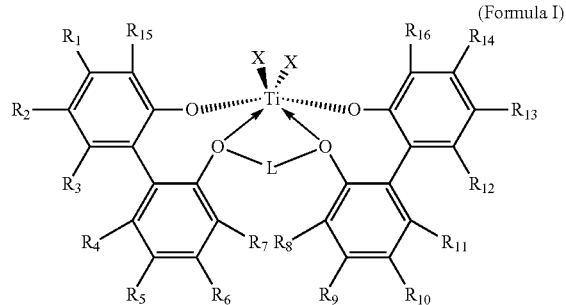

(Formula I)

wherein each of $R_7$ and $R_8$ is independently a $C_1$ to $C_{20}$ alkyl, aryl, aralkyl or a hydrogen; wherein each of $R_5$ and $R_{10}$ is a dialkyl or trialkyl substituted silyl; wherein each of $R_2$ and $R_{13}$ is independently a $C_1$ to $C_{20}$ alkyl, aryl, aralkyl or a hydrogen; wherein each of $R_{15}$ and $R_{16}$ is a 2,7-disubstituted carbazolyl or a 3,6-disubstituted carbazolyl;

wherein L is a $C_2$-$C_4$ alkylene that forms a 2-carbon bridge, 3-carbon bridge, or a 4-carbon bridge respectively, between the two oxygen atoms to which L is covalently bonded;

wherein each of $R_1$, $R_3$, $R_4$, $R_6$, $R_9$, $R_{11}$, $R_{12}$, and $R_{14}$ is independently a halide or a hydrogen; and wherein each X is independently a hydrocarbyl, halide, pseudohalide, hydroxy group, alkoxy group, phenoxy group, aryloxy group, or a hydrogen and at least one X is not a hydrocarbyl.

2. The precatalyst of claim 1, wherein each of $R_7$ and $R_8$ is a $C_1$ alkyl or each of $R_7$ and $R_8$ is a hydrogen.

3. The precatalyst of claim 1, wherein each of $R_5$ and $R_{10}$ is octyl dimethyl silyl.

4. The precatalyst of claim 1, wherein each of $R_2$ and $R_{13}$ is a 1,1-dimethylethyl.

5. The precatalyst of claim 1, wherein each of $R_{15}$ and $R_{16}$ is a 2,7-di-t-butylcarbaoyl or a 3,6-di-t-butylcarbazolyl.

6. The precatalyst of claim 1, wherein L is a saturated $C_3$ alkylene.

7. The precatalyst of claim 1, wherein each X is chlorine.

8. The precatalyst of claim 1, further comprising a silica support that is free of activator, wherein the silica support that is free of activator supports the precatalyst.

9. A method of making a titanium biphenylphenol polymerization catalyst, the method comprising contacting, under activating conditions, a titanium biphenylphenol polymerization precatalyst of Formula I of claim 1 with an activator so as to activate the titanium biphenylphenol polymerization precatalyst of Formula I, thereby making the titanium biphenylphenol polymerization catalyst.

10. A titanium biphenylphenol polymerization catalyst made by the method of claim 9.

11. A method of making a polyethylene composition, the method comprising:
polymerizing an olefin monomer in a single gas-phase polymerization reactor in presence of the titanium biphenylphenol polymerization catalyst of claim 10 to make a polyethylene composition.

12. The method of claim 11, before the polymerizing step, further comprising:
making the titanium biphenylphenol polymerization catalyst; and
feeding the titanium biphenylphenol polymerization catalyst into the single gas-phase polymerization reactor.

13. A titanium biphenylphenol polymerization precatalyst of Formula I:

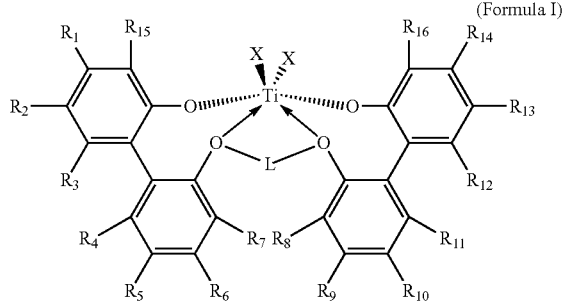

(Formula I)

wherein each of $R_7$ and $R_8$ is independently a $C_1$ to $C_{20}$ alkyl, aryl, aralkyl or a hydrogen;
wherein each of $R_5$ and $R_{10}$ is fluorine;

wherein each of $R_2$ and $R_{13}$ is independently a $C_1$ to $C_{20}$ alkyl, aryl aralkyl or a hydrogen;

wherein each of $R_{15}$ and $R_{16}$ is a 2,7-disubstituted carbazolyl or a 3,6-disubstituted carbazolyl;

wherein L is a $C_2$-$C_4$ alkylene that forms a 2-carbon bridge, 3-caron bridge, or a 4-carbon bridge respectively, between the two oxygen atoms to which L is covalently bonded;

wherein each of $R_1$, $R_3$, $R_4$, $R_6$, $R_9$, $R_{11}$, $R_{12}$, and $R_{14}$ is independently a halide or a hydrogen; and wherein each X is independently a hydrocarbyl, halide, pseudohalide, hydroxy group, alkoxy group, phenoxy group, aryloxy group, or a hydrogen and at least one X is not a hydrocarbyl.

14. A method making a titanium biphenylphenol polymerization catalyst, the method comprising contracting, under activating conditions, a titanium biphenylphenol polymerization precatalyst of Formula I with an activator so as to activate the titanium biphenylphenol polymerization precatalyst of formula I, thereby making the titanium biphenylphenol polymerization catalyst, wherein Formula I is:

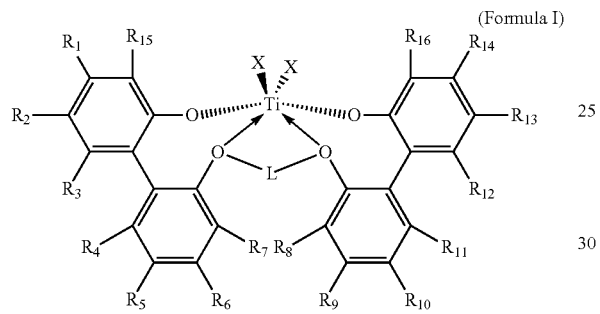

(Formula I)

wherein each of $R_7$ and $R_8$ is independently a $C_1$ to $C_{20}$ alkyl, aryl, aralkyl or a hydrogen;

wherein each of $R_5$ and $R_{10}$ is independently a $C_1$ to $C_{20}$ alkyl, aryl, aralkyl, halide, or a hydrogen;

wherein each of $R_2$ and $R_{13}$ is independently a $C_1$ to $C_{20}$ alkyl, aryl, aralkyl or a hydrogen;

wherein each of $R_{15}$ and $R_{16}$ is a 2,7-disubstituted carbazolyl or a 3,6-disubstituted carbazolyl;

wherein L is $C_2$-$C_4$ alkylene that forms a 2-carbon bridge, 3-carbon bridge, or a 4-carbon bridge respectively, between the two oxygen atoms to which L is covalently bonded;

wherein each of $R_1$, $R_3$, $R_4$, $R_6$, $R_9$, $R_{11}$, $R_{12}$, and $R_{14}$ is independently a halide or a hydrogen; and wherein each X is independently a hydrocarbyl, halide, pseudohalide, hydroxy group, alkoxy group, phenyl group, aryloxy group, or a hydrogen and at least one X is not a hydrocarbyl and contacting an activator-free solution of the titanium biphenylphenol polymerization precatalyst of Formula I dissolved in an alkane solvent with a silica support containing thereon a spray-dried activator to make the titanium biphenylphenol polymerization catalyst on a silica support.

* * * * *